United States Patent [19]

Hall, II et al.

[11] 4,019,388
[45] Apr. 26, 1977

[54] GLASS TO METAL SEAL

[75] Inventors: George R. Hall, II, Euclid; Jack M. White, Novelty; Roger L. Krechmery, Mentor, all of Ohio

[73] Assignee: Bailey Meter Company, Wickliffe, Ohio

[22] Filed: Mar. 11, 1976

[21] Appl. No.: 665,828

[52] U.S. Cl. .................... 73/398 AR; 73/88.5 SD; 73/420; 228/124; 228/179; 338/4
[51] Int. Cl.² .......................................... G01L 9/04
[58] Field of Search ......... 228/122, 124, 179, 208; 338/4, 2; 73/88.5 SD, 398 AR, 420

[56] References Cited

UNITED STATES PATENTS

| | | | |
|---|---|---|---|
| 3,305,818 | 2/1967 | Brueggemann | 73/398 AR X |
| 3,697,917 | 10/1972 | Orth et al. | 73/398 AR X |

*Primary Examiner*—Al Lawrence Smith
*Assistant Examiner*—K. J. Ramsey

*Attorney, Agent, or Firm*—Vytas R. Matas; Joseph M. Maguire

[57] ABSTRACT

A pressure sensitive Silicon chip is indirectly bonded to a Stainless Steel housing of an electronic pressure transmitter through an intermediate holder assembly. This indirect bonding prevents thermal cracking of the Silicon chip due to the difference in thermal expansion of the Stainless Steel housing and the Silicon chip. The holder assembly includes a Borosilicate glass tube having the Silicon chip bonded thereto which tube is soldered to a Nickel-Iron alloy holder by a eutectic alloy solder. In assembly, the Nickel-Iron holder is first brazed to the stainless Steel housing at a first temperature greater than the maximum non-destructive temperature of either the chip or the glass tube and the glass tube is then soldered to the Nickel-Iron holder at a lower temperature which will not destroy the chip or the tube holder.

11 Claims, 4 Drawing Figures

GLASS TO METAL SEAL

BACKGROUND OF THE INVENTION

1. Field of the Invention

This invention relates generally to indirectly mounting pressure sensitive Silicon chips to Stainless Steel housings and particularly to mounting such a Silicon chip to Stainless Steel through a holder assembly comprising a Borosilicate glass holder soldered to a Nickel-Iron holder.

2. Description of the Prior Art

In electronic pressure transmitters using pressure sensitive Silicon chips an existing problem is the mounting of the Silicon chip to the corrosion resistant metal housing such as a Stainless Steel housing. The Silicon chip and the Stainless Steel housing of the transmitter have different coefficients of thermal expansion which causes thermal fatigue and cracking of the pressure sensing Silicon chip when directly bonded to the Stainless Steel housing and operated in the operating temperature range of the transmitter (−40° F to +250° F).

To overcome this problem, prior designs utilized a flexible epoxy adhesive to bond the Silicon chip either directly to the Stainless Steel housing or to bond the Silicon chip to a glass tubular holder which was then bonded to the Stainless Steel housing. The flexible epoxy was supposed to absorb any strain from the difference in temperature expansion. The glass holder was found to be, nevertheless, necessary to provide a strong mounting holder for the Silicon chip which had a coefficient of expansion similar to the Silicon chip and which would absorb most of the shock of the expansion differential between the Stainless Steel housing and the Silicon chip without transmitting these forces to the more fragile Silicon chip. However, this type of flexible epoxy bonding was still found to have certain drawbacks. The epoxy seal was found to deteriorate with the passage of time as well as being unable to withstand the temperature cycling of the instrument between the extremes of the operating temperatures of −40° F to 250° F. Other problems with the epoxy seal were found to be poor shock withstanding ability of the seal and a high water absorption by the epoxy which caused the seal to deteriorate and the instrument to either malfunction or become inoperative.

Having found epoxy bonding to be inadequate, brazing of a Silicon chip assembly directly to the Stainless Steel case was considered. However the temperatures required to properly braze the assembly to the Stainless Steel case were found to exceed the maximum temperatures of either the Silicon chip or the Silicon compatible glass chip holder.

SUMMARY OF THE INVENTION

To eliminate the problems of the prior art bonding techniques a Nickel-Iron alloy holder is first brazed directly to the corrosion resistant metal housing of the pressure transmitter at a temperature which will effectively braze the holder to the housing and which exceeds the maximum non-destructive temperatures of either the Silicon chip or any glass chip holer to thereby provide a strong bond between the Stainless Steel case and the Nickel-Iron holder. The Nickel-Iron holder is compatible with both the Stainless Steel case and the glass holder in providing a material with an intermediate coefficient of thermal expansion between the Silicon chip and the Stainless Steel housing. Having thus provided a strong bond between the Stainless Steel case and the Nickel-Iron holder, the glass holder with the Silicon chip bonded thereto is then soldered to the Nickel-Iron holder at a temperature (430° F) below the maximum non-destructive temperature of the glass holder and the Silicon chip using a eutectic washer solder having a eutectic point of approximately 430° F. To provide a good seal by this soldering technique it was found desirable to first metallize the joining surface of the glass holder with layers of Chrome and Gold and to also deposit a layer of Chrome and Gold on the joining surface of the Nickel-Iron holder.

In view of the foregoing it will be appreciated that one aspect of the present invention is to provide a method of bonding glass to metal by soldering with a eutectic alloy.

Another aspect of the present invention is to provide a method of mounting a pressure sensitive Silicon chip to a corrosion resistant metallic housing through a holder assembly.

Another aspect of the present invention is to provide an intermediate holder assembly for mounting a pressure sensitive Silicon chip to a Stainless Steel housing.

These and other aspects of the present invention will become more evident after a review of the following description of the preferred embodiment and the accompanying drawings.

DESCRIPTION OF THE PREFERRED EMBODIMENT

Figure 1:
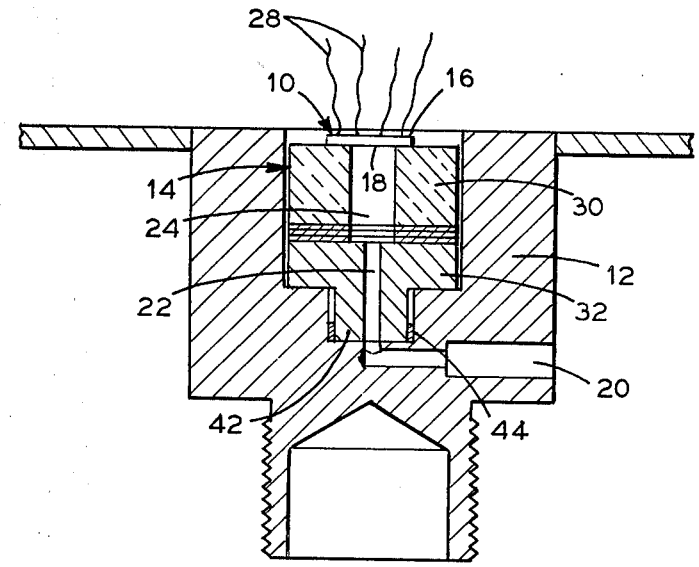
FIG. 1 depicts a cross section of a pressure sensitive Silicon chip indirectly mounted to a Stainless Steel case of a pressure transmitter by way of a holder assembly.
Figure 2:
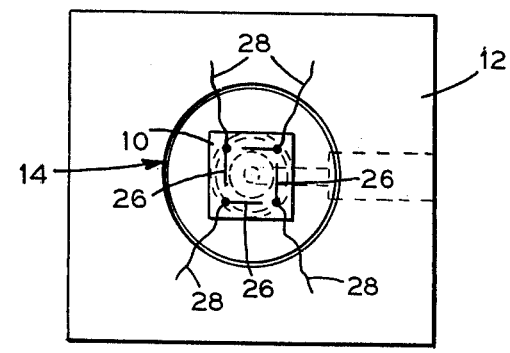
FIG. 2 depicts a top view of the FIG. 1 embodiment.

Referring now to the drawings generally and FIGS. 1 and 2 in particular, a pressure sensitive Silicon chip 10 is shown indirectly mounted to a part of a Stainless Steel housing 12 of an electronic pressure transmitter by way of a holder assembly 14. The Silicon chip 10 is mounted to the assembly 14 to allow one side of the Silicon chip 16 to be exposed to a first pressure while the other side of the Silicon chip 18 is exposed to a second pressure level. In a ΔP electronic pressure transmitter one pressure would be applied to one face 16 of the Silicon chip 10 while a second pressure would be applied to a second face 18 of the Silicon chip 10 by way of a passageway 20 formed in the housing 12 which passageway 20 is in communication with passageways 22 and 24 centrally formed in the holder assembly 14 to lead to the face 18 of the Silicon chip 10. In situations where the pressure transmitter is a gauge pressure transmitter, the passageway 20 communicates with atmospheric pressure while the sensed pressure is applied to the face 16 of the Silicon chip 10. For an absolute pressure transmitter the passageway 20 is sealed after a vacuum is created in passageways 22 and 24.

The Silicon chip 10 has a series of resistance elements 26 embedded in the Silicon chip which elements 26 change resistance as the Silicon chip is stressed due to any pressure differential established between the faces 16 and 18 of the Silicon chip 10. The resistance elements 26 have electrical leads 28 individually connected to the resistance elements 26 and establish their respective resistance based signals to a Wheatstone bridge forming a part of the detection circuitry of most known electronic pressure transmitters.

Figure 3:
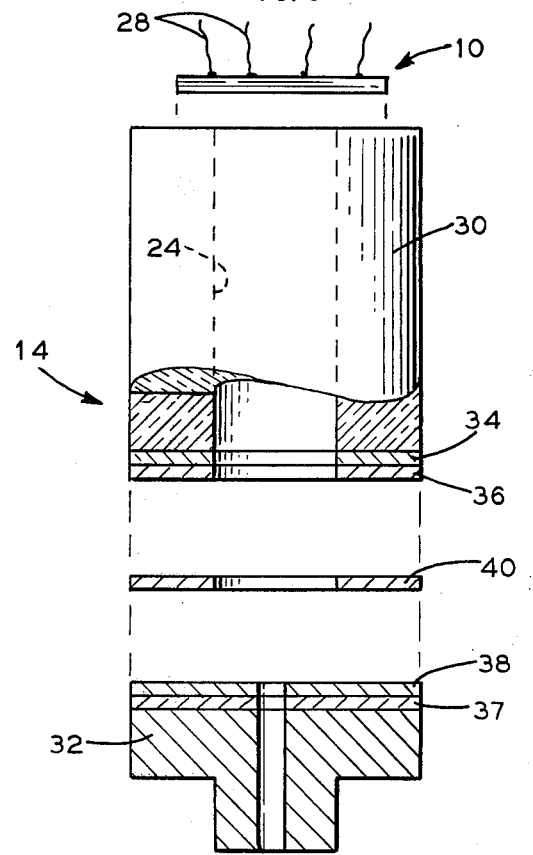
FIG. 3 depicts an expanded view of the holder assembly of FIG. 1.

As may be best seen with reference to FIG. 3, the holder assembly 14 includes a Borosilicate glass tubular holder 30 formed from 7740 Pyrex material. This material was found to have a coefficient of temperature expansion compatible with that of the Silicon chip 10 in the normal operating temperature range of most electronic pressure transmitters (−40° F to 250° F). One end of the tubular holder 30 is sealed by mounting the Silicon chip 10 thereon using any number of known adhesives and bonds. The opposite end of the tubular holder 30 is then metallized to allow a strong bond to be later formed with a 39–42% Nickel-Iron holder 32 of the holder assembly 14 as will be more fully described later.

The metallizing of the glass tubular holder 30 includes the deposition of a thin Chrome layer 34 approximately 1200 Angstroms thick by evaporating Chrome in a vacuum or an inert atmosphere on to the tubular member 30. The Chrome layer is then coated with a thin layer of Gold 36 approximately 4000 Angstroms in thickness by evaporating Gold in a vacuum or an inert atmosphere on to the Chrome layer. To provide compatability of joined surfaces on both the glass holder 30 and the Nickel-Iron holder 32, the Nickel-Iron holder 32 may also be coated with a thin 1200 Angstrom Chrome layer 37 and Gold layer 38 approximately 4000 Angstroms thickness by evaporating Gold in a vacuum or an inert atmosphere thereon. To effectively bond the metallized tubular holder 30 to the holder 32, it was found that a eutectic soldering washer 40 approximately 96.5 percent Tin and 3.5 percent Silver was most effective.

Since the glass tubular holder 30 of the holder assembly 14 cannot survive the brazing temperatures required to braze the holder 32 to the Stainless Steel housing 12, the mounting of the holder assembly 14 to the Stainless Steel case 12 may be accomplished only in the following specific step order. The holder 32 is fitted into the Stainless Steel housing 12 and brazed thereto along the stem portion 42 of the holder 32 with Copper braze 44. The holder 32 is then metallized with the Chrome 37 and Gold 38 layers. The brazing is performed in an inert atmosphere and at a temperature of approximately 2200° F. Clearly such temperatures would ruin not only the glass tubular holder 30 but the Silicon chip 10, making the instrument inoperative. Once the holder 32 is strongly secured to the Stainless Steel housing 12, the metallized glass tubular holder 30 with the Silicon chip mounted thereto may be soldered to the holder 32. This soldering is done at approximately 450° F which is within the temperature limits of the tubular member 30 and the Silicon chip 10 and still provides a strong seal between the tubular member 30 and the holder 32. The eutectic point of the washer 40 is approximately 430° F.

From the foregoing it will be seen that by mounting the assembly 14 to the Stainless Steel case 12 of the pressure transmitter according to the outlined steps, a strong seal is formed between a Stainless Steel housing 12 and the Silicon chip 10 which does not subject the Silicon chip to thermal fatigue, cracking, and error problems inherent in prior known mounting methods.

Figure 4:
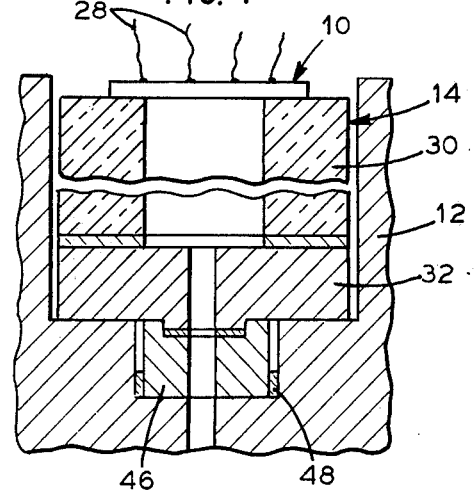
FIG. 4 depicts an alternate construction of a part of the holder assembly of FIG. 1.

Turning next to FIG. 4, since Nickel-Iron can only be joined to Stainless Steel at the high temperatures mentioned, brazing is required. A problem also sometimes occurs in metallizing and soldering the glass holder 30 to the Nickel-Iron holder 32 which is already brazed to the housing 12. The clearances between the housing 12 and the Nickel-Iron holder 32 which is recessed therein make such metallizing and soldering operations cumbersome and time consuming. To overcome these problems the Nickel-Iron holder 32 is first brazed at high temperature to a Stainless Steel stem 46 made from 430 Stainless Steel outside of the case 12. The complete holder assembly 14 is next constructed outside of the case 12 by metallizing both joining surfaces of the Nickel-Iron holder 32 and the glass holder 30 and soldering them together as was discussed earlier. Since low temperature soldering is possible between Stainless Steel, the complete assembly 14 is then fitted into the housing 12 and the Stainless Steel stem 46 is soldered at approximately 430 F to the Stainless Steel housing 12 using a 96.5 percent Tin 2.5 percent Silver eutectic solder 48. To improve the seal between the housing 12 and the stem 46 the soldered surfaces of the housing 12 and the stem 46 may be first Nickel plated.

Certain modifications and improvements will occur to those skilled in the art upon reading this specification. It will be understood that all such improvements and modifications have been deleted for the sake of conciseness and readability but are properly within the scope of the following claims.

What we claim is:

1. A method of indirectly mounting a pressure sensitive Silicon element to a corrosion resistant metallic housing comprising the steps of:
   brazing a Nickel-Iron holder assembly to a corrosion resistant metallic stem;
   mounting the Silicon element to a glass holder assembly;
   soldering the Nickel-Iron holder assembly to the glass holder assembly; and
   soldering the corrosion resistant stem to the corrosion resistant housing to indirectly mount the Silicon element to the housing.

2. A method of indirectly mounting a pressure sensitive Silicon element to a corrosion resistant metallic housing of a pressure transmitter through intermediate assemblies comprising the steps of:
   mounting the Silicon element to a glass assembly;
   brazing a Nickel-Iron assembly to the corrosion resistant metallic housing;
   metallizing a surface of the glass assembly;
   metallizing a surface of the Nickel-Iron assembly;
   providing a eutectic soldering material; and
   soldering the metallized surfaces of the glass and the Nickel-Iron assembly using the eutectic soldering material.

3. A method as set forth in claim 2 wherein said step of metallizing a surface of the glass assembly includes the steps of:
   evaporating a layer of Chrome on the surface of the glass assembly; and
   evaporating a layer of Gold on the Chrome layer.

4. A method as set forth in claim 3 wherein said step of metallizing a surface of the Nickel-Iron assembly includes the steps of evaporating a layer of Chrome and Gold on the Nickel-Iron assembly.

5. A method as set forth in claim 2 wherein said step of brazing is done in an inert atmosphere.

6. A method of bonding a surface of Borosilicate glass to a surface of Nickel-Iron comprising the steps of:
   coating the glass surface with a thin layer of Chrome;
   coating the Chrome surface of the glass with a thin layer of Gold;
   coating the Nickel-Iron surface with a thin layer of Chrome;
   coating the Chrome surface of the Nickel-Iron with a thin layer of Gold; and
   soldering the coated glass layer to the coated Nickel-Iron layer using a Tin-Silver eutectic alloy.

7. A mounting assembly for indirectly mounting a pressure sensitive Silicon chip to a corrosion resistant metallic housing of a pressure transmitter comprising:
   a Nickel-Iron holder brazed to the housing of the transmitter to provide a mounting surface;
   a glass holder having a coefficient of expansion similar to the Silicon chip and having a first surface soldered to the mounting surface of said Nickel-Iron surface and a second surface opposite said first surface; and
   a pressure sensitive Silicon chip being mounted to said second surface of said glass holder.

8. A mounting assembly as set forth in claim 7 wherein said glass holder is formed from Borosilicate glass into a tubular member having said Silicon chip mounted on one end of the tubular member to seal that end of the tubular member.

9. A mounting assembly as set forth in claim 8 wherein the end of said tubular member opposite said Silicon chip has a layer of Chrome deposited thereon and a layer of Gold deposited on the Chrome layer.

10. A mounting assembly as set forth in claim 9 wherein said Nickel-Iron holder has the mounting surface covered with a layer of Gold.

11. A mounting assembly as set forth in claim 10 wherein the covered surfaces of said glass holder and said Nickel-Iron holder are soldered together with a Tin-Silver eutectic alloy.

* * * * *